United States Patent [19]

Jacobson

[11] 4,416,699

[45] Nov. 22, 1983

[54] ALUMINA COATED TIO$_2$

[75] Inventor: Howard W. Jacobson, Wilmington, Del.

[73] Assignee: E. I. Du Pont de Nemours & Co., Wilmington, Del.

[21] Appl. No.: 468,769

[22] Filed: Feb. 22, 1983

Related U.S. Application Data

[63] Continuation-in-part of Ser. No. 341,334, Jan. 21, 1982, abandoned.

[51] Int. Cl.$^3$ ................................................ C09C 1/36
[52] U.S. Cl. ................................ 106/300; 106/308 B
[58] Field of Search ................. 106/300, 308 B, 308 S

[56] References Cited

U.S. PATENT DOCUMENTS

| | | | |
|---|---|---|---|
| 3,409,454 | 11/1968 | Andrew et al. | 106/300 |
| 3,847,640 | 11/1974 | Daubenspeck et al. | 106/300 |
| 3,853,575 | 12/1974 | Holle et al. | 106/300 |
| 4,022,636 | 5/1977 | Murray | 106/300 |
| 4,328,040 | 5/1982 | Panek et al. | 106/300 |

FOREIGN PATENT DOCUMENTS 1368601 10/1974 United Kingdom ................ 106/300

*Primary Examiner*—Helen M. McCarthy

[57] ABSTRACT

A chalk-fade resistant TiO$_2$ pigment exhibiting excellent gloss and dispersion that is comprised of TiO$_2$ particles with a composite coating of dense alumina and boehmite alumina totaling 2–6% by weight alumina based on the TiO$_2$ and a process for the preparation of such TiO$_2$ pigment.

26 Claims, No Drawings

ALUMINA COATED TIO$_2$

CROSS-REFERENCE TO RELATED APPLICATION

This application is a continuation-in-part of application Ser. No. 341,334, filed Jan. 21, 1982, now abandoned.

DESCRIPTION

1. Technical Field

The present invention relates to titanium dioxide pigment coated with a composite of dense alumina and boehmite alumina and the process for their preparation. More specifically, the present invention relates to a titanium dioxide pigment with 2–6% by weight alumina composed of a composite of dense/boehmite alumina exhibiting good resistance to chalk-fade reaction, high gloss and excellent dispersibility.

2. Background Art

The treatment of TiO$_2$ to improve its durability by applying a protective coating is well known in the art.

U.S. Pat. No. 3,437,502 describes an improved TiO$_2$ pigment with high opacity and outstanding ease of dispersibility in liquid coating obtained by applying a dense silica coating to TiO$_2$ followed by a coating of alumina.

U.S. Pat. No. 3,928,057 discloses a TiO$_2$ pigment having a first coating of porous silica or alumina and a dense coating of silica over the porous coating to achieve a pigment with a high degree of hiding power and durability.

U.S. Pat. No. 3,523,810 discloses a TiO$_2$ pigment coated with boehmite alumina having a crystal size of at least 50 Å in diameter to provide the TiO$_2$ which will give the latex paint composition excellent viscosity stability.

U.S. Pat. No. 4,022,636 discloses a method for preparing a TiO$_2$ pigment that has improved material handling characteristics for plastic systems by coating the TiO$_2$ first with amorphous alumina and then boehmite alumina. However, the total level of alumina coated is insufficient to provide a satisfactory product for paint systems where both gloss, dispersibility and chalk-fade resistance are desired. Such a pigment would not exhibit the chalk-fade resistance, gloss and dispersibility of the pigment of the present invention.

British Pat. No. 1,368,601 discloses coating TiO$_2$ with alumina and then dissolving off a portion of the alumina coating and applying a second coating of hydrous titania and more alumina in order to prepare a TiO$_2$ pigment with improved gloss retention and resistance to chalking.

Durability for rutile TiO$_2$ pigment has been achieved in the past by depositing a dense silica coating on the pigment. An alumina coating has been applied over the silica coating to enhance pigment processing, as well as gloss and dispersibility. The gloss and dispersibility of a rutile TiO$_2$ pigment having only a coating of silica is inferior to a rutile TiO$_2$ pigment with an alumina coating. However, alumina coatings that are all boehmite alumina do not provide chalk-fade resistance.

DISCLOSURE OF THE INVENTION

Now a durable TiO$_2$ pigment has been found comprising TiO$_2$ particles having a composite coating of dense alumina and boehmite alumina totaling 2–6% by weight alumina based on the TiO$_2$, said composite dense and boehmite alumina present in a weight ratio of 8:1–1:2 of dense to boehmite, the dense alumina defined as alumina having incorporated therein sulfate ion in a weight ratio of aluminum to sulfate ion of 10:1–1.3:1.

The present invention provides a TiO$_2$ rutile pigment with an alumina coating that exhibits excellent gloss and dispersibility along with lightfastness (resistance to chalk fade).

The present TiO$_2$ pigment has an alumina coating that is characterized by a portion being dense (containing sulfate) to achieve the chalk-fade resistance and a portion being boehmite, a form of hydrated alumina, to achieve both acceptable gloss and dispersibility.

The composite coating of the invention is applied to TiO$_2$ particles that have been prepared either by the vapor phase oxidation of titanium tetrachloride or with hydrolysis of titanium sulfate. One process for preparing the durable TiO$_2$ pigment having 2–6% by weight of alumina based on the TiO$_2$, said alumina having a 8:1–1:2 weight ratio of dense to boehmite alumina and a weight ratio of aluminum to sulfate ion of 10:1–1.3:1 comprises (a) adding TiO$_2$ rutile pigment to water with agitation to form a slurry;
(b) heating the thus prepared slurry to 40°–90° C.;
(c) adding a soluble basic aluminum compound and/or an inorganic base to the slurry to attain a pH of 7.0–9.5;
(d) adding a sufficient amount of a soluble aluminum compound to deposit a total of 0.5–2% by weight alumina based on the TiO$_2$ while maintaining the pH at 7.0–9.5,
(e) lowering the pH to 5.2–6.5 with an acid;
(f) adding a sufficient amount of the soluble aluminum compound to deposit in the presence of the required amount of sulfate ions 2–6% by weight of total alumina based on the TiO$_2$ while maintaining the pH at 5.2–6.5 at a temperature of 40°–65° C.;
(g) optionally agitating the slurry at 40°–65° C. for 1–180 minutes; and
(h) separating and washing the thus treated TiO$_2$ free of soluble salts.

The above process involves depositing boehmite alumina on the TiO$_2$ and then depositing dense alumina under conditions whereby a composite coating of dense and boehmite alumina is formed.

Another process for preparing the composite coating involves first depositing dense alumina on the TiO$_2$ and then subjecting the dense alumina to conditions whereby some of the dense alumina is converted to boehmite alumina. Accordingly, another process for preparing the durable TiO$_2$ pigment having 2–6% by weight of alumina based on the TiO$_2$, said alumina having an 8:1–1:2 weight ratio of dense to boehmite alumina and a weight ratio of aluminum to sulfate ion of 10:1–1.3:1 comprises:

(a) adding TiO$_2$ rutile pigment to water with agitation to form a slurry;
(b) heating the thus prepared slurry to 30°–65° C.;
(c) adjusting the pH to 5.2–6.5;
(d) adding a sufficient amount of the soluble aluminum compound to deposit in the presence of the required amount of sulfate ions 2–6% by weight of total alumina based on the TiO$_2$ while maintaining the pH at 5.2–6.5 at a temperature of 30°–65° C.;
(e) agitating the slurry at 30°–65° C. for 5–180 minutes;

(f) adjusting the pH to 6.0–9.5;
(g) agitating the slurry for 5–60 minutes at 40°–70° C. while maintaining the pH at 6.0–9.5; and
(h) separating and washing the thus treated $TiO_2$ free of soluble salts.

The composite dense and boehmite alumina structure of the present invention provides the $TiO_2$ with improved durability, gloss and dispersibility. Composite structures outside the range of the invention do not provide the desired chalk resistance, gloss and dispersibility. For example, higher levels of dense relative to boehmite alumina gives higher chalk-fade resistance by marginal dispersibility and gloss.

Dense alumina is alumina having sulfate ions strongly adsorbed therein at a weight ratio of 10:1–1.3:1 of aluminum to sulfate ion. Alumina is densified by curing the alumina with the sulfate ions for a period of time at a temperature of 30°–65° C. and a pH of 5.2–6.5. Higher temperatures during precipitation or curing, e.g., 90° C. would result in less than the required sulfate ion retention. Likewise, precipitation and curing outside the pH range will affect the amount of sulfate ion retention.

Boehmite is a crystalline form of alumina that contains sorbed water. The water is commonly intercalated between $Al(OH)_6$ octahedral layers in both random and regular arrangements.

The dense alumina provides the $TiO_2$ pigments with durability, e.g., lightfastness as measured by chalk-fade resistance. The boehmite alumina enhances gloss and dispersibility of the $TiO_2$ pigments.

The $TiO_2$ used to form the pigment with the improved durability, gloss and dispersibility of this invention is rutile $TiO_2$.

The sulfate ion may come from a variety of sources. It may come from the acid used to precipitate the alumina, e.g., sulfuric acid. It may come from the same source as the alumina, e.g., $Al_2(SO_4)_3$. It may also be separately added into the slurry when the slurry does not contain sufficient sulfate. For example, if sodium aluminate is used as the source of alumina and HCl as the acid, one could add a soluble sulfate such as sodium sulfate to provide sulfate ions. Any inorganic sulfate that will not interfere with the process can be used as a source of soluble sulfate.

The soluble aluminum compound of this invention provides the alumina needed. The soluble aluminum compound may be a basic or acidic aluminum salt. Representative examples of such compounds include sodium aluminate, potassium aluminate, aluminum sulfate, aluminum chloride, etc. Thus in some instances it may be convenient to use a basic aluminum salt to provide alumina as well to adjust the pH.

The preferred ratio of dense to boehmite alumina is 5:1–1:2. The preferred ratio of aluminum to sulfate in the dense alumina is 5:1–1.3:1. The preferred pH for the slurry prior to addition of the alumina source is 1.5–3. The preferred alumina sources are sodium aluminate and aluminum sulfate. The most preferred alumina source is sodium aluminate. The preferred acid for pH adjustment is sulfuric acid. The preferred base for pH adjustment is sodium hydroxide. The preferred process for forming the composite coating on $TiO_2$ involves subjecting the $TiO_2$ to conditions for boehmite formation followed by depositing alumina under conditions that will produce or form dense alumina.

It has surprisingly also been found that the addition of tetrapotassium pyrophosphate to the slurry of $TiO_2$ after or with the addition of the soluble aluminum compound results in a pigment of further improved durability over the durability achieved with only the composite alumina of the invention. Generally, 0.1–0.4% by weight of tetrapotassium pyrophosphate based on the $TiO_2$ is added to achieve improved results. The tetrapotassium pyrophosphate may be added simultaneously with the soluble aluminum compound or after the addition of the soluble aluminum compound but before the curing is completed by the agitation of the slurry for the time of up to 180 minutes.

The process of the invention wherein a soluble aluminum compound is added to the $TiO_2$ slurry at a pH of 7.0–9.5 and 40°–90° C. forms boehmite alumina. Preferred conditions for forming the boehmite are 45°–60° C. at a pH of 8–9. The subsequent deposition of alumina at a pH of 5.2–6.5 results in the formation of dense alumina during the treatment at 40°–65° C. The preferred conditions for depositing dense alumina are 5.7–6.5 pH and a temperature of 45°–60° C. The coated product may be optionally cured for 1–180 minutes while maintaining the pH at 5.2–6.5 and 40°–65° C. It is preferable to cure the coated product for 1–180 minutes at 5.2–6.5 pH and 40°–65° C. This process is preferred since the alternative process of the conversion of the dense alumina, deposited first, to boehmite alumina is more sensitive to the conditions and therefore more difficult to control in commercial operations. Boehmite alumina is stable at the low pH after being formed at the high pH of the process. Dense alumina is formed at the low pH but not stable at the high pH of the process.

The process of the invention wherein the soluble aluminum compound is added to the slurry of $TiO_2$, after adjusting the pH to 5.2–6.5, involves formation of dense alumina when cured at 30°–65° C. for 5–180 minutes. The preferred initial pH of the slurry is 1.0–3.5 when the soluble aluminum compound is a sodium or potassium aluminate. The preferred subsequent treatment of the dense alumina at 45°–60° C. and pH of 8–9 for 5–40 minutes is to form boehmite alumina. Thus the alumina deposited on the $TiO_2$ initially that is dense alumina is partially converted to boehmite alumina to form the composite dense and boehmite structure of the invention.

When preparing pigments in accordance with the invention by first precipitating dense alumina at an acid pH, it is not always necessary to raise the pH in the range of between 7 and 9.5 in order to have a small portion of boehmite alumina present. As illustrated in Examples 5 and 6, a small proportion of boehmite alumina is formed, along with dense alumina, if the alumina is precipitated at an acid pH close to neutrality, e.g., at pH 6.2 or higher. Further quantities of boehmite may be formed by digesting the alumina-coated pigment at higher temperatures without raising the pH as well as by raising the pH (up to 9.5) without raising the temperature although the rate of conversion to boehmite proceeds more rapidly when both the pH and temperatures are increased between the ranges indicated.

It will be noted from the tables of results above that the lightfastness values of pigments prepared in accordance with the invention are comparable with, and in some cases superior to, the Example B control in which separate after treatments with both silica and alumina are employed. Also, in general, the dispersibility of the pigments of the invention are superior. This illustrates a significant advantage arising from this invention, i.e., that it is possible to achieve comparable pigment properties without requiring to precipitate another metal oxide, such as silica, onto the pigment particles.

Any inorganic base may be used for pH adjustment. The preferred base is sodium hydroxide. Representative examples include sodium hydroxide, potassium hydroxide and ammonium hydroxide.

Any acid may be used in the process of this invention that has sufficient acid strength to reach the desired pH under the conditions involved. Representative examples include HCl, $H_2SO_4$, $HNO_3$, acetic, $H_3PO_4$, etc.

EXAMPLES

The following examples further illustrate the invention. In all cases the total alumina ($Al_2O_3$) of the coating was 3% by weight.

EXAMPLE 1

(Process for Preparing the Product of the Invention by First Forming Boehmite Alumina and Then Dense Alumina)

In a stirred vessel, 6200 g rutile $TiO_2$ pigment in 15.5 liters of water were heated to 60° C. and had a pH of 3.85. Sixty-three ml of concentrated $H_2SO_4$ were added to lower the pH of the pigment slurry to 1.5. The pH was adjusted to 8.5 with 34 ml of 50% NaOH and 196 ml of a sodium aluminate solution (315 g $Al_2O_3$/liter) over a 15 minute period, this formed 1% boehmite alumina based on the $TiO_2$. The pH of the system was then lowered to pH=5.5 with 6 ml of concentrated $H_2SO_4$. During a 30 minute period, a total of 393 ml of sodium aluminate solution (315 g $Al_2O_3$/liter) were added while holding the pH between 5.5 and 6.0 with concentrated $H_2SO_4$ (125 ml). After the alumina addition, the slurry was given a 15 minute cure at pH=5.7 and temperature at 60° C. 12.4 Grams of tetrapotassium pyrophosphate (TKPP) in 75 ml of water were added along with 2 ml concentrated $H_2SO_4$ to hold the pH at 5.7. The treated pigment slurry was then given a 30 minute cure at pH=5.7 and 60° C. The pigment was then filtered, washed free of salts and dried at 120° C. The pigment was then micronized in an 8" steam micronizer using 3 lbs steam/lb pigment and evaluated for lightfastness, gloss and dispersion. The data is summarized in the table below.

EXAMPLE 2

The procedure of Example 1 was followed except the TKPP treatment step was omitted. The data is summarized in the table below.

EXAMPLE 3

(Coating Dense Alumina First Followed by Increasing pH to Form Boehmite Alumina)

In a stirred vessel 5000 g rutile $TiO_2$ pigment in 12.5 liters of water were heated to 60° C. and had a pH=3.65. Thirty-two ml of concentrated $H_2SO_4$ were added to lower the pH to 1.5. During a 30 minute period, 417 ml of sodium aluminate solution (360 g $Al_2O_3$/liter) were added at pH 6.2-6.4 controlling the pH with 93 ml of concentrated $H_2SO_4$. The slurry was cured for 30 minutes at pH=6.2, temperature 60° C. Ten grams of tetrapotassium pyrophosphate (TKPP) dissolved in 50 ml of water were added along with 2 ml concentrated $H_2SO_4$ to maintain the pH at 6.2. The slurry was then cured for 15 minutes. The pH of the slurry was increased to 7.5 with 50% NaOH solution for boehmite formation. After 30 minutes, the pigment was filtered, washed and dried at 120° C. The pigment was then micronized in an 8" steam micronizer using 2.8 lbs steam/lb of pigment and evaluated for lightfastness, gloss and dispersion. The data is summarized in the table below.

EXAMPLE 4

The procedure of Example 3 was followed except the TKPP treatment was omitted. The pigment was evaluated. The data is summarized in the table below.

EXAMPLE 5

(High Ratio of Dense Alumina to Boehmite)

In a stirred vessel 6200 g rutile $TiO_2$ pigment in 15.5 liters of water were heated to 60° C. and had a pH of 3.43. Fifty ml of concentrated $H_2SO_4$ were added to lower the pH to 1.5. During a 30 minute period, 517 ml of sodium aluminate solution (360 g $Al_2O_3$/liter) were added at a pH=6.2 with pH control maintained with 111 ml of concentrated $H_2SO_4$. The pigment slurry was cured for 30 minutes. 12.4 Grams of tetrapotassium pyrophosphate (TKPP) were added along with 1 ml concentrated $H_2SO_4$ to hold pH at 6.2. The slurry was cured for 15 minutes at pH=6.2 and 60° C. The pigment was then filtered, washed free of soluble salts and dried at 120° C. The dried pigment was steam micronized in an 8" micronizer using 3 lbs steam/lb pigment and evaluated for lightfastness, gloss and dispersion. The data is summarized in the table below.

EXAMPLE 6

The same procedure as in Example 5 was followed except without the TKPP treatment. The data is summarized in the table below.

EXAMPLE A (All Boehmite Alumina Coating)

In a stirred vessel 6200 g rutile $TiO_2$ pigment in 15.5 liters of water were heated to 60° C. and had a pH=3.35. Twenty-eight ml of concentrated $H_2SO_4$ were added to lower the pH to 1.5. During a 30 minute period, 517 ml of sodium aluminate solution (360 g $Al_2O_3$/liter) were added at pH=8.5 controlling the pH with 102 ml of concentrated $H_2SO_4$. The alumina coated pigment slurry was cured for 30 minutes at pH=8.5 and 60° C. The pigment was then filtered, washed free of soluble salts and dried at 120° C. The dried pigment was steam micronized in an 8" micronizer using 3 lbs steam/lb pigment and then evaluated for lightfastness, gloss and dispersion. The data is summarized in the table below.

EXAMPLE B (Coating of 1.5% $SiO_2$/3.0% $Al_2O_3$)

In a stirred vessel 6800 g rutile $TiO_2$ pigment in 17 liters of water were heated to 90° C. and had a pH=2.90. Added 27.2 ml of 50% NaOH to pH=9.0. Added 255 ml sodium silicate solution (400 g/liter $SiO_2$) controlling the pH at 9.4 with 21 ml of concentrated $H_2SO_4$. The silica coated $TiO_2$ slurry was cured for 30 minutes at pH=8.5 and 90° C. During a 30 minute period, 570 ml of sodium aluminate solution (360 g/$Al_2O_3$ per liter) were added while controlling the pH at 8.5 and temperature at 60° C. The silica/alumina coated $TiO_2$ slurry was cured 15 minutes at pH=8.5 and 60° C. The coated pigment was filtered, washed free of soluble salts and dried at 120° C. The dried pigment was steam micronized in an 8" micronizer using 3 lbs steam/lb pigment and then evaluated for lightfastness, gloss and dispersion.

A scale of 0-10 was used to rate the pigments after exposure to ultraviolet light. A pigment with a value of 10 would show no UV activity whereas an extremely photoactive pigment would get a value of zero. Titanium dioxide pigment with lightfastness values in excess of 5 can be used in applications where UV durability is desired. Any lightfastness test normally used for paint systems can be used to obtain lightfastness values. The data is summarized in the table below.

The following table summarizes the pertinent data for the above examples:

|  | Lightfastness Value | 30J Gloss | TFW-124 Dispersion | Boehmite* Alumina % |
|---|---|---|---|---|
| Example 1 | 6.25 | 72 | 7¼-6½ (3) | 1.0 |
| Example 2 | 5.25 | 73 | 7-6 (7) | 1.1 |
| Example 3 | 6.0 | 71 | 7-6 (7) | 1.2 |
| Example 4 | 5.25 | 72 | 7-6 (6) | 0.9 |
| Example 5 | 7.5 | 67 | 7-5 (22) | 0.4 |
| Example 6 | 6.5 | 67 | 7-5 (20) | 0.4 |
| Controls |  |  |  |  |
| Example A All Boehmite Coating | 3.75 | 73 | 7¼-6½ (5) | 2.8 |
| Example B 1.5% SiO$_2$/ 3.0% Al$_2$O$_3$ | 6.25 | 63 | 7-3 (22) | 1.1 |

*Estimated from infrared absorption curves and thermal gravimetric analysis based on the weight of coated TiO$_2$ product.

|  | Sulfate Content % | Ratio Dense/Boehmite Al$_2$O$_3$ | SiO$_2$ %* |
|---|---|---|---|
| Example 1 | 0.36 | 2 | — |
| Example 2 | 0.38 | 1.8 | — |
| Example 3 | 0.34 | 1.5 | — |
| Example 4 | 0.40 | 2.3 | — |
| Example 5 | 0.67 | 6.5 | — |
| Example 6 | 0.62 | 6.5 | — |
| Controls |  |  |  |
| Example A All Boehmite Coating | 0.02 | 0.06 | — |
| Example B 1.5% SiO$_2$/ 3.0% Al$_2$O$_3$ | 0.02 | — | 1.5 |

*Based on the weight of TiO$_2$ coated product.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

I claim:

1. TiO$_2$ rutile pigment particles exhibiting good resistance to chalk-fade reaction, high gloss and excellent dispersibility suitable for use in paint systems comprising a composite coating consisting essentially of dense alumina and boehmite alumina totaling 2-6% by weight alumina based on the TiO$_2$, said composite dense and boehmite alumina present in a weight ratio of 8:1-1:2 of dense to boehmite, the dense alumina defined as alumina having incorporated therein sulfate ion in a weight ratio of aluminum to sulfate of 10:1-1.3:1.

2. The TiO$_2$ particles of claim 1 wherein the weight by ratio of dense to boehmite alumina is 5:1-1:2.

3. The TiO$_2$ particles of claim 1 having incorporated with the alumina 0.1-0.4% by weight of tetrapotassium pyrophosphate based on the TiO$_2$.

4. The TiO$_2$ particles of claim 2 having incorporated with the alumina 0.1-0.4% by weight of tetrapotassium pyrophosphate based on the TiO$_2$.

5. The TiO$_2$ particles of claim 1 having a weight ratio of aluminum to sulfate in the coating of 5:1-1.3:1.

6. The TiO$_2$ particles of claim 5 having incorporated with the alumina 0.1-0.4% by weight of tetrapotassium pyrophosphate based on the TiO$_2$.

7. The TiO$_2$ particles of claim 6 having a weight ratio of dense to boehmite alumina of 3:1-1:2.

8. A process for preparing a chalk-fade resistant TiO$_2$ pigment having 2-6% by weight of alumina based on the TiO$_2$, said alumina having a 8:1-1:2 weight ratio of dense to boehmite alumina and a weight ratio of aluminum to sulfate of 10:1-1.3:1 comprising (a) adding TiO$_2$ rutile pigment to water with agitation to form a slurry;
(b) heating the thus prepared slurry to 40°-90° C.;
(c) adding a soluble basic aluminum comcompound and/or an inorganic base to the slurry to raise the pH to 7.0-9.5;
(d) adding a sufficient amount of the soluble aluminum compound to deposit a total of 0.5-2% by weight alumina based on the TiO$_2$ while maintaining the pH at 7.0-9.5;
(e) lowering the pH to 5.2-6.5 with an acid;
(f) adding a sufficient amount of the soluble aluminum compound to deposit in the presence of the required amount of sulfate ions 2-6% by weight of total alumina based on the TiO$_2$ while maintaining the pH at 5.2-6.5 at a temperature of 40°-65° C.;
(g) optionally agitating the slurry at 40°-65° C. for 1-180 minutes; and
(h) separating and washing the thus treated TiO$_2$ free of soluble salts.

9. The process of claim 8 wherein 0.1-0.4% by weight of tetrapotassium pyrophosphate based on the TiO$_2$ is added after (f) but before (g).

10. The process of claim 8 wherein the soluble aluminum compound is sodium aluminate.

11. The process of claim 8 wherein sulfuric acid is used to reach the pH of steps (d), (e) and (f).

12. The process of claim 11 wherein 0.1-0.4% by weight of tetrapotassium pyrophosphate based on the TiO$_2$ is added after (f) but before (g).

13. The process of claim 8 wherein the temperature in step (b) is 45°-60° C.

14. The process of claim 8 wherein the pH in step (c) is 8-9.

15. The process of claim 8 wherein the pH is 5.7-6.5 and the temperature is 45°-60° C. in step (f).

16. The process of claim 8 wherein the slurry is agitated at 45°-65° C. for 1-180 minutes after step (f).

17. A process for preparing a durable TiO$_2$ pigment having 2-6% by weight of alumina based on the TiO$_2$, said alumina having a 8:1-1:2 weight ratio of dense to boehmite alumina and a weight ratio of aluminum to sulfate of 10:1-1.3:1 comprising (a) adding TiO$_2$ rutile pigment to water with agitation to form a slurry;
(b) heating the thus prepared slurry to 30°-65° C.;

(c) adjusting the pH to 5.2–6.5;
(d) adding a sufficient amount of the soluble aluminum compound to deposit in the presence of the required amount of sulfate ions 2–6% by weight of total alumina based on the $TiO_2$ while maintaining the pH at 5.2–6.5 at a temperature of 30°–65° C.;
(e) agitating the slurry at 30°–65° C. for 5–180 minutes;
(f) adjusting the pH to 6.0–9.5;
(g) agitating the slurry for 5–60 minutes at 40°–70° C. while maintaining the pH of 6.0–9.5; and
(h) separating and washing the thus treated $TiO_2$ free of soluble salts.

18. The process of claim 17 wherein the pH prior to the adjustment of step (c) is 1.5–3.

19. The process of claim 17 wherein 0.1–0.4% by weight of tetrapotassium pyrophosphate based on the $TiO_2$ is added after (d) but before (e).

20. The process of claim 17 wherein 0.1–0.4% by weight of tetrapotassium pyrophosphate based on the $TiO_2$ is added simultaneously with the aluminum compound.

21. The process of claim 17 wherein the soluble aluminum compound is sodium aluminate.

22. The process of claim 17 wherein sulfuric acid is used in step (d) as a source of sulfate.

23. The process of claim 22 wherein 0.1–0.4% by weight of tetrapotassium pyrophosphate based on the $TiO_2$ is added after step (d) and before step (e).

24. The process of claim 17 wherein step (g) is conducted at 45°–60° C. at a pH of 8–9 for 5–40 minutes.

25. $TiO_2$ rutile pigment particles exhibiting good resistance to chalk-fade reaction, high gloss and excellent dispersibility suitable for use in paint systems having a composite coating of dense alumina and boehmite alumina totaling 2–6% by weight alumina based on the $TiO_2$, said composite dense and boehmite alumina present in a weight ratio of 8:1–1:2 of dense to boehmite, the dense alumina defined as alumina having incorporated therein sulfate in a weight ratio of aluminum to sulfate of 10:1–1.3:1 prepared by the process of claim 8.

26. $TiO_2$ rutile pigment particles exhibiting good resistance to chalk-fade reaction, high gloss and excellent dispersibility suitable for use in paint systems having a composite coating of dense alumina and boehmite alumina totaling 2–6% by weight alumina based on the $TiO_2$, said composite dense and boehmite alumina present in a weight ratio of 8:1–1:2 of dense to boehmite, the dense alumina defined as alumina having incorporated therein a sulfate in a weight ratio of aluminum to sulfate of 10:1–1.3:1 prepared by the process of claim 17.

* * * * *